United States Patent

Skralskis

[15] 3,706,359
[45] Dec. 19, 1972

[54] ENERGY ABSORBING STRUCTURES

[72] Inventor: Edward P. Skralskis, Lake Oswego, Oreg.

[73] Assignee: Omark Industries, Inc., Portland, Oreg.

[22] Filed: Sept. 25, 1970

[21] Appl. No.: 75,426

[52] U.S. Cl. .......................188/1 C, 293/70, 293/89
[51] Int. Cl. ...............................................F16f 7/12
[58] Field of Search ......293/DIG. 3, 70, 89; 188/1 C; 213/1 A

[56] References Cited

UNITED STATES PATENTS 3,482,653   12/1969   Shinmaki et al. ......................188/1 C
3,097,725   7/1963   Peterson................................188/94
2,615,373   10/1952   Pegard .....................................90/58
2,251,347   8/1941   Williams et al........................213/221

Primary Examiner—Gerald M. Forlenza
Assistant Examiner—Robert Saifer
Attorney—Buckhorn, Blore, Klarquist and Sparkman

[57] ABSTRACT

An automobile frame includes telescoping front and rear sections normally extended by energy absorbing devices each including pairs of drawable rods secured together by turnbuckle nuts and engaging pairs of drawing dies in bars fixed to the sections. Energy absorbing devices include ears on bumpers and frames held together by drawable or extrudable rods with long threaded shanks on the rods to permit takeup after partial drawing or extruding.

5 Claims, 9 Drawing Figures

EDWARD P. SKRALSKIS
*INVENTOR*

BY
BUCKHORN, BLORE, KLARQUIST & SPARKMAN
*ATTORNEYS*

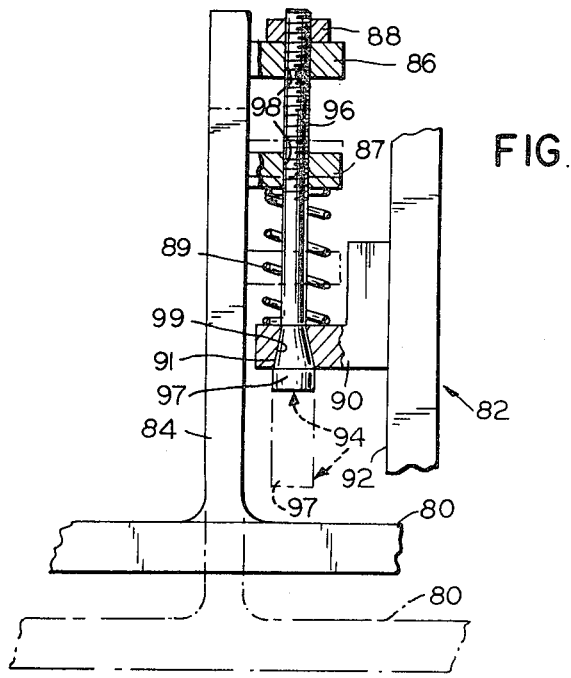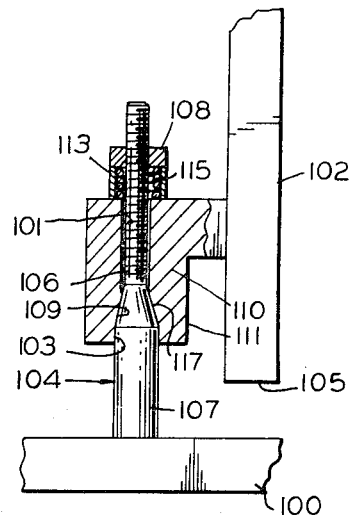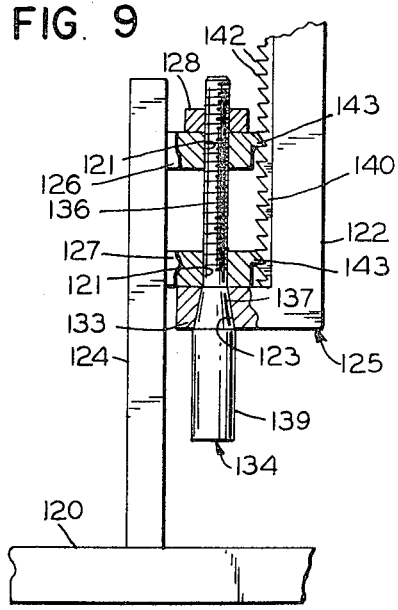

ENERGY ABSORBING STRUCTURES

DESCRIPTION

This invention relates to improved energy absorbing devices, and more particularly to improved chassis frame and bumper energy absorbing devices.

An object of the invention is to provide new and improved energy absorbing devices.

Another object of the invention is to provide new and improved chassis frame and bumper energy absorbing devices.

A further object of the invention is to provide a telescoping chassis frame and drawable rods and drawing dies connecting telescoping sections of the frame.

Another object of the invention is to provide an energy absorbing device including a drawing or extruding die and a drawable or extrudable rod having a long threaded shank permitting slack takeup after partial drawing or extrusion.

Another object of the invention is to provide an energy absorbing device including spring takeup means to take up slack after partial drawing or extrusion of a drawable or extrudable rod.

Another object of the invention is to provide an energy absorbing device including a pawl lock to hold one member against movement relative to another member after partial drawing or extrusion of a rod fastening the members together.

In the drawings:

FIG. 7 is a fragmentary, horizontal sectional view of an energy absorbing device forming an alternate embodiment of the invention;

FIG. 8 is a fragmentary, horizontal sectional view of an energy absorbing device forming an alternate embodiment of the invention; and FIG. 9 is a fragmentary, horizontal sectional view of an energy absorbing device forming an alternate embodiment of the invention.

EMBODIMENT OF FIGS. 1 TO 4

Figure 1:
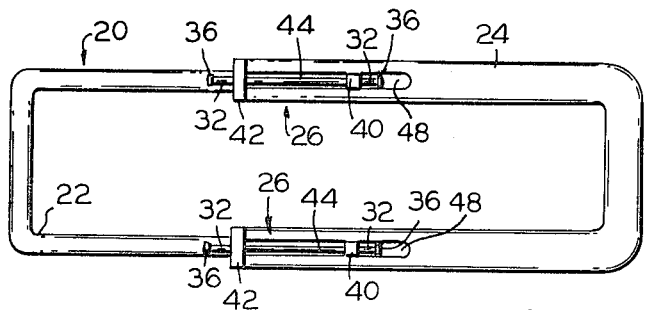
FIG. 1 is a top plan view of an energy absorbing device forming one embodiment of the invention.
Figure 2:
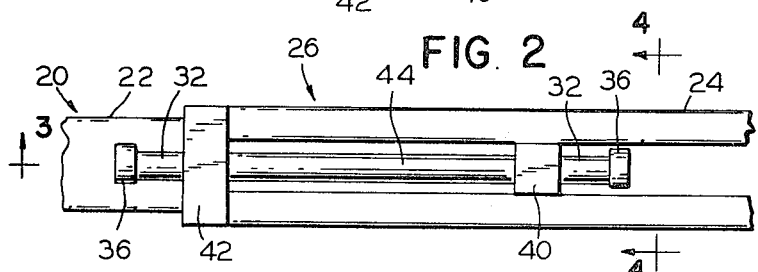
FIG. 2 is an enlarged fragmentary top plan view of the energy absorbing device of FIG 1.
Figure 4:
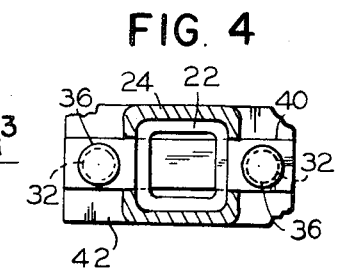
FIG. 4 is a vertical sectional view taken along line 4—4 of FIG. 2.
Figure 3:
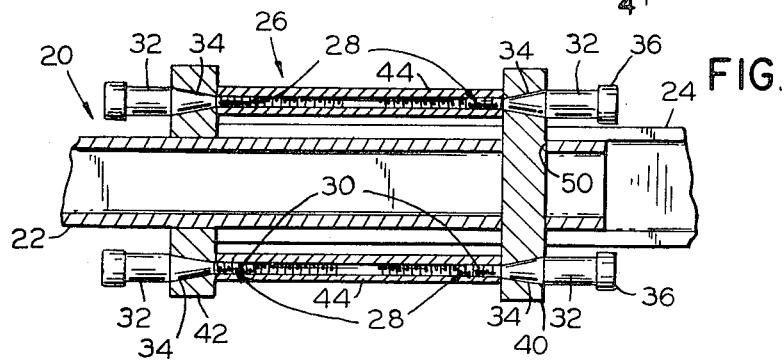
FIG. 3 is a vertical sectional view taken along line 3—3 of FIG. 2.

Referring now in detail to the drawings, there is shown in FIGS. 1 to 4 an energy absorbing device comprising a frame 20 of an automobile. The frame includes a generally U-shaped, tubular front section 22 telescoped in a generally U-shaped, tubular rear section 24. The sections are locked rigidly together by an energy dissipating unit 26 against all usual or normal forces tending to push the sections together. The unit includes pairs of drawable rods 28 having threaded shank 30, drawable end portions 32, tapered transition portions 34 and stops 36. The pairs of rods are pressed into drawing dies 38 in bars 40 and 42 rigidly secured to the sections 22 and 24 by turnbuckle nuts 44 screwed onto the shank. The turnbuckle nuts 44 keep the bars 40 and 42 from being moved toward each other. The bar 40 extends through and is slidable along slots 48 in the arms of the section 24 and through holes 50 in the arms of the section 22 which last-mentioned arms fit closely and slidably in the arms of the section 24.

EMBODIMENT OF FIGS. 5 AND 6

Figure 5:
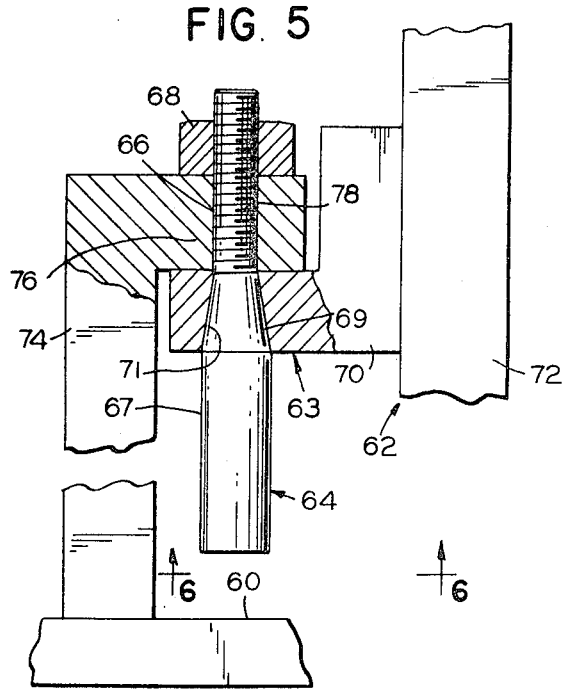
FIG. 5 is a fragmentary horizontal sectional view of an energy absorbing device forming an alternate embodiment of the invention.
Figure 6:
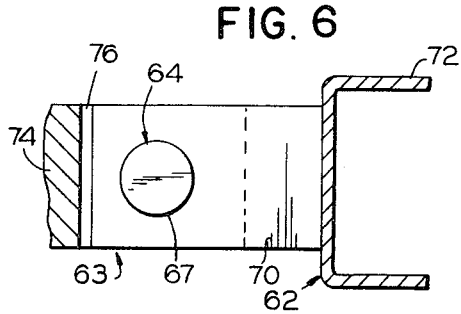
FIG. 6 is a vertical sectional view taken along line 6—6 of FIG. 5.

An energy absorbing device forming an alternate embodiment of the invention is shown in FIGS. 5 and 6 and includes automobile bumper 60 normally held against movement toward a chassis or frame 62 of the automobile by energy absorbing fastener units 63 each comprising a drawable rod 64 having a threaded shank 66 threaded along its entire length, a nut 68 and ears of bracket 70 welded to a channel-like longitudinal member 72 of the frame 62. Rigid columns 74 welded to the bumper 60 have thick ears 76 having bores 78 through which the threaded shanks 66 extend and which are held against the brackets 70 by the nuts 68.

The drawable rod 64 has a long, enlarged, cylindrical drawable portion 67 joined to the shank by a tapered or frustoconical transition portion 69 which abuts a tapered or frustoconical, drawing die orifice 71. The rod 64 and nut 68 hold the bumper 60 against movement toward the frame for all usually encountered forces and whenever there is a substantial collision of the bumper, the drawable portion 67 is drawn through the die which absorbs the forces to keep the shock from being transmitted to the frame. If the collision is not too great, the drawable portions are only partly drawn, and the nuts 68 can be screwed down further on the shanks 66 to tighten the assembly again, the bumper then being spaced closer to the frame 62 by the length of the draw of the portion 64. The thickness of the ears 76 determines the distance that the nuts can be taken up. However, washers or spacer sleeves can be placed between the nuts and the ears to extend the takeup distance.

EMBODIMENT OF FIG. 7

An energy absorbing device forming an alternate embodiment of the invention is shown in FIG. 7 and is generally like the device of FIGS. 5 and 6 but includes pairs of ears 86 and 87 on rigid columns 84 secured to a bumper 80. Threaded shanks 96 of drawable rods 94 extend slidably through aligned, close-fitting bores 98 in the ears, and compression springs 89 on the shanks between the ears 87 and ears of brackets 90 are welded to longitudinal frame members 92 of an automobile chassis frame 82. Nuts 88 are screwed onto the shanks 96. The rods 94 have long, enlarged, cylindrical drawable portions 97 and transition portions 91 abutting drawing die orifices 99 in the ears 90.

The springs 89 act as spacers to keep slack out of the system and provide a long takeup distance to enable the threaded shanks to be quite long and the takeup to be coextensive therewith. The springs also remove the necessity of immediately tightening the nuts on the shanks to prevent rattles.

Normally the springs 89 are fully compressed. When there is a substantial collision, the portions 97 are drawn to absorb the energy and the springs expand to take up slack, the normal condition being shown in broken lines in FIG. 7, and the condition after a collision only partly drawing the rods being shown in full lines.

EMBODIMENT OF FIG. 8

An energy absorbing device forming an alternate embodiment of the invention and shown in FIG. 8 is generally similar to the device of FIGS. 5 and 6 but includes a pair of brackets 110 (only one of which is shown) each having a long, generally tubular ear portion 111 to enable an extrudable portion 107 of an extrudable rod 104 to be very long. The rod 104 is stiff and may be either solid or a heavy walled tube. The ear portion has a long cylindrical bore 101, a cylindrical entrance portion 103 and a frustoconical extruding die portion 109. The rod has a long threaded shank 106 fitting closely in and slidable along the bore 101, and the drawable portion 107 extends in slidable, but close-fitting engagement, in the entrance portion 103. The rod has a frustoconical transition portion 117 joining the shank and the extrudable portion. The extrudable portion is welded to a bumper 100.

Initially nuts 108 are screwed onto the shanks 106 and abut collars or spacer sleeves 113 to hold the drawable transition portions 117 tightly against the die portions 109, the nuts compressing springs 115 into the collars. The brackets 110 are welded to longitudinal members 102 of chassis frame 105. When an abnormally high force is applied to the bumper 100, the rods are pushed into the dies 103 and are extruded to the diameter of the bore 101 and absorb the energy to prevent shock to the frame. The springs then hold the rods tightly against the ears until the nuts are again screwed down the rods. By having the ears long and the threaded shanks 106 long, plus the effective throw of the springs, the extrudable portions are quite long. The rods may be zone heat treated, as by induction heating, to make the shanks 106 substantially harder and less ductile than the portions 107 and 117.

EMBODIMENT OF FIG. 9

An energy absorbing device forming an alternate embodiment of the invention and shown in FIG. 9 is generally similar to the energy absorbing device of FIG. 7 and includes pairs of ears 126 and 127 on a pair of rigid columns 124 welded to a bumper 120. Threaded shanks 136 of drawable rods 134 extend closely and slidably through bores 121 in the ears, and nuts 128 are screwed onto the end portions of the shanks to abut ears 126 and bring transition portions 137 of the rods tightly into drawing die portions 123 of ears 133. The ears 133 are welded to longitudinal members 122 of chassis frame 125, and also include drawing die portions 123 fitting closely on the transition portions 137. The rods have long, drawable portions 139.

Pawl locks 140 have ratchet-like teeth 142 and are secured to the members 122 in biting engagement with the ends of the ears 126, and serve to prevent forward movement of the lugs after the portions 139 have been partly drawn and until nuts 128 are screwed further onto the shanks. The pawls may be urged by leaf springs (not shown) into engagement with the lugs to permit the pawls to be held back from the lugs for pushing the lugs back to their initial positions.

What is claimed is:
1. In an energy absorbing fastener structure,
 a drawable rod member having a long shank and a drawable portion, the shank being threaded along a predetermined length thereof,
 a nut of a length substantially less than that of the shank and threaded thereon and screwed on the end portion of the threaded portion,
 a die for drawing the drawable portion,
 a tubular means surrounding a substantial length of the threaded portion of the shank and against which the nut bears to enable the nut to be screwed further on the threaded portion to take up slack after a partial draw of the drawable portion,
 and ratchet and pawl means on the tubular means and the chassis frame.
2. In an energy absorbing fastener structure,
 a drawable rod member having a long shank and a drawable portion, the shank being threaded along a predetermined length thereof,
 a nut of a length substantially less than that of the shank and threaded thereon and screwed on the end portion of the threaded portion,
 a die for drawing the drawable portion,
 a tubular means surrounding a substantial length of the threaded portion of the shank and against which the nut bears to enable the nut to be screwed further on the threaded portion to take up slack after a partial draw of the drawable portion,
 and a compression spring urging the nut and the die apart.
3. The energy absorbing fastener structure of claim 2 wherein the spring is between the nut and the tubular means.
4. The energy absorbing fastener structure of claim 3 including a sleeve surrounding the spring and abutting the tubular means.
5. The energy absorbing fastener structure of claim 2 wherein the spring is between the tubular means and the die.

* * * * *